(12) United States Patent
Hailpern et al.

(10) Patent No.: US 10,599,839 B2
(45) Date of Patent: Mar. 24, 2020

(54) SECURITY INVESTIGATIONS USING A CARD SYSTEM FRAMEWORK

(71) Applicant: HEWLETT PACKARD ENTERPRISE DEVELOPMENT LP, Houston, TX (US)

(72) Inventors: Joshua Hailpern, Santa Clara, CA (US); Ronald Calvo, Sunnyvale, CA (US); Suhas Shetty, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 218 days.

(21) Appl. No.: 15/720,406

(22) Filed: Sep. 29, 2017

(65) Prior Publication Data

US 2019/0102542 A1 Apr. 4, 2019

(51) Int. Cl.
| | |
|---|---|
| *G06F 21/00* | (2013.01) |
| *G06F 21/55* | (2013.01) |
| *G06F 21/56* | (2013.01) |
| *G06F 21/57* | (2013.01) |
| *H04L 12/24* | (2006.01) |

(Continued)

(52) U.S. Cl.
CPC .......... *G06F 21/552* (2013.01); *G06F 21/554* (2013.01); *G06F 21/566* (2013.01); *G06F 21/577* (2013.01); *G06F 21/604* (2013.01); *H04L 41/069* (2013.01); *H04L 41/22* (2013.01); *H04L 63/10* (2013.01); *H04L 63/14* (2013.01);

(Continued)

(58) Field of Classification Search
CPC ..... G06F 21/552; G06F 21/554; G06F 21/566

USPC .................................................. 726/1
See application file for complete search history.

(56) References Cited

U.S. PATENT DOCUMENTS

| | | | |
|---|---|---|---|
| 9,516,052 | B1 | 12/2016 | Chauhan et al. |
| 9,516,053 | B1 | 12/2016 | Muddu et al. |

(Continued)

FOREIGN PATENT DOCUMENTS

| | | |
|---|---|---|
| WO | WO-2016020660 A1 | 2/2016 |
| WO | WO-2016122632 A | 8/2016 |

OTHER PUBLICATIONS

Cisco Systems, Inc., "Cisco Cyber Threat Defense Solution Overview," Solution Overview, May 2013, pp. 1-7.

(Continued)

*Primary Examiner* — Anthony D Brown
(74) *Attorney, Agent, or Firm* — Hewlett Packard Enterprise Patent Department (57) ABSTRACT

Examples disclosed herein relate to security investigations using a card system framework. Some of the examples enable presenting a first card on a user interface, the first card comprising a first content tile that describes a first security alert object that is associated with a first plurality of content items, the first plurality of content items comprising at least one of: a source host identifier, an Internet Protocol (IP) address, a severity level, a confidence level, an alert status, a user identifier, an alert type, an attack stage, a port, a protocol, and a geographical location; and in response to an indication that a first content item among the first plurality of content item is requested about the first security alert object, presenting a second card on the user interface, the second card comprising a second content tile that describes a second entity object that is associated with a second plurality of content items.

20 Claims, 9 Drawing Sheets

(51) Int. Cl.
*H04L 29/06* (2006.01)
*G06F 21/60* (2013.01)

(52) U.S. Cl.
CPC ...... *H04L 63/1408* (2013.01); *H04L 63/1425* (2013.01); *H04L 63/1433* (2013.01)

(56) References Cited

U.S. PATENT DOCUMENTS

| | | | |
|---|---|---|---|
| 10,073,589 B1* | 9/2018 | Jesensky | G06F 3/0482 |
| 2008/0016569 A1 | 1/2008 | Hammer et al. | |
| 2008/0040322 A1* | 2/2008 | Rucker | G06F 16/986 |
| 2008/0256594 A1* | 10/2008 | Satish | G06F 21/41 |
| | | | 726/1 |
| 2017/0063930 A1 | 3/2017 | Chesla | |
| 2017/0134425 A1 | 5/2017 | Albertson et al. | |

OTHER PUBLICATIONS

Kelly Hodgkins, iPhone 101: How to view your safari browsing history on your iPhone or iPad, Jun. 30, 2014, 7 Pgs.

\* cited by examiner

521 — CAUSE A FIRST CARD TO BE DISPLAYED ON A USER INTERFACE, THE FIRST CARD COMPRISING A FIRST CONTENT TILE THAT DESCRIBES A FIRST SECURITY ALERT OBJECT THAT IS ASSOCIATED WITH A FIRST PLURALITY OF CONTENT ITEMS, THE FIRST PLURALITY OF CONTENT ITEMS COMPRISING AT LEAST ONE OF: A SOURCE HOST IDENTIFIER AND AN INTERNET PROTOCOL (IP) ADDRESS

522 — IN RESPONSE TO AN INDICATION THAT A FIRST CONTENT ITEM AMONG THE FIRST PLURALITY OF CONTENT ITEM IS REQUESTED ABOUT THE FIRST SECURITY ALERT OBJECT, CAUSE A SECOND CARD TO BE DISPLAYED ON THE USER INTERFACE, THE SECOND CARD COMPRISING A SECOND CONTENT TILE THAT DESCRIBES A SECOND ENTITY OBJECT THAT IS ASSOCIATED WITH A SECOND PLURALITY OF CONTENT ITEMS, WHEREIN THE FIRST AND SECOND CARDS APPEAR STACKED ON TOP OF EACH OTHER

SECURITY INVESTIGATIONS USING A CARD SYSTEM FRAMEWORK

BACKGROUND

The amount of information available from the Internet and in an enterprise environment is continually on the rise. User experience for the end users of the information often depend on how the information is organized, presented, and displayed on a user interface, how the information is stored, and how the information is shared with others.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The amount of information available from the Internet and in an enterprise environment is continually on the rise. User experience for the end users of the information often depend on how the information is organized, presented, and displayed on a user interface, how the information is documented or stored, and how the information is shared with others. In one example, a security analyst who wishes to investigate or research on a security alert (e.g., an alert about a potential security threat) often need to review and analyze large amounts of data related to the alert. This may require the analyst to access multiple different data sources to find relevant data. Even if the data can be found, the investigation steps and the data analyzed during each of those steps are not automatically documented or stored. In addition, the history of investigation is not readily available to other analysts to review or continue with the investigation. In addition, the data retrieved for one investigation is not easily reusable in another investigation, taking unnecessary compute power and time for data retrieval.

Examples disclosed herein provide technical solutions to these technical challenges by enabling security investigations using a card system framework. The card system framework may organize relevant data in a card format. A "card," as used herein, refers to a reusable component that behaves like a shell or template that can support any content in it. A card may comprise a card header, a content tile, and/or other elements. A "content tile," as used herein, refers to a reusable component that delivers the main content of the card. When a card is presented on a user interface, a user may request more details on a particular content item in the content tile. This user selection (e.g., clicking on a link for the particular content item, hovering the cursor over the particular content item, and/or other ways to indicate the selection) would trigger another card to be displayed on the user interface where the new card has a content tile that includes the requested details for the particular content item. As the user continues to interact with various cards being presented on the user interface and request additional details about certain content items, more cards would appear on the user interface. This collection of cards would provide a well-documented history of the user's research or investigation. The collection of cards can be also shared with another user or users to view, edit, and/or make a duplicate card or a duplicate collection of cards. The content tile may be reusable, meaning that a particular content tile can be reused as a standalone component without a card, or reused in a single card or multiple different cards. Therefore, using such a card system framework, relevant data can be organized and presented in a more meaningful way, the history of research on the relevant data (e.g., how the research was conducted) can be effectively documented and shared with others, and the content tiles generated during the research can be captured, stored, and reused in other contexts.

Some of the examples disclosed herein enable presenting a first card on a user interface, the first card comprising a first content tile that describes a first security alert object that is associated with a first plurality of content items, the first plurality of content items comprising at least one of: a source host identifier, an Internet Protocol (IP) address, a severity level, a confidence level, an alert status, a user identifier, an alert type, an attack stage, a port, a protocol, and a geographical location; and in response to an indication that a first content item among the first plurality of content item is requested about the first security alert object, presenting a second card on the user interface, the second card comprising a second content tile that describes a second entity object that is associated with a second plurality of content items.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
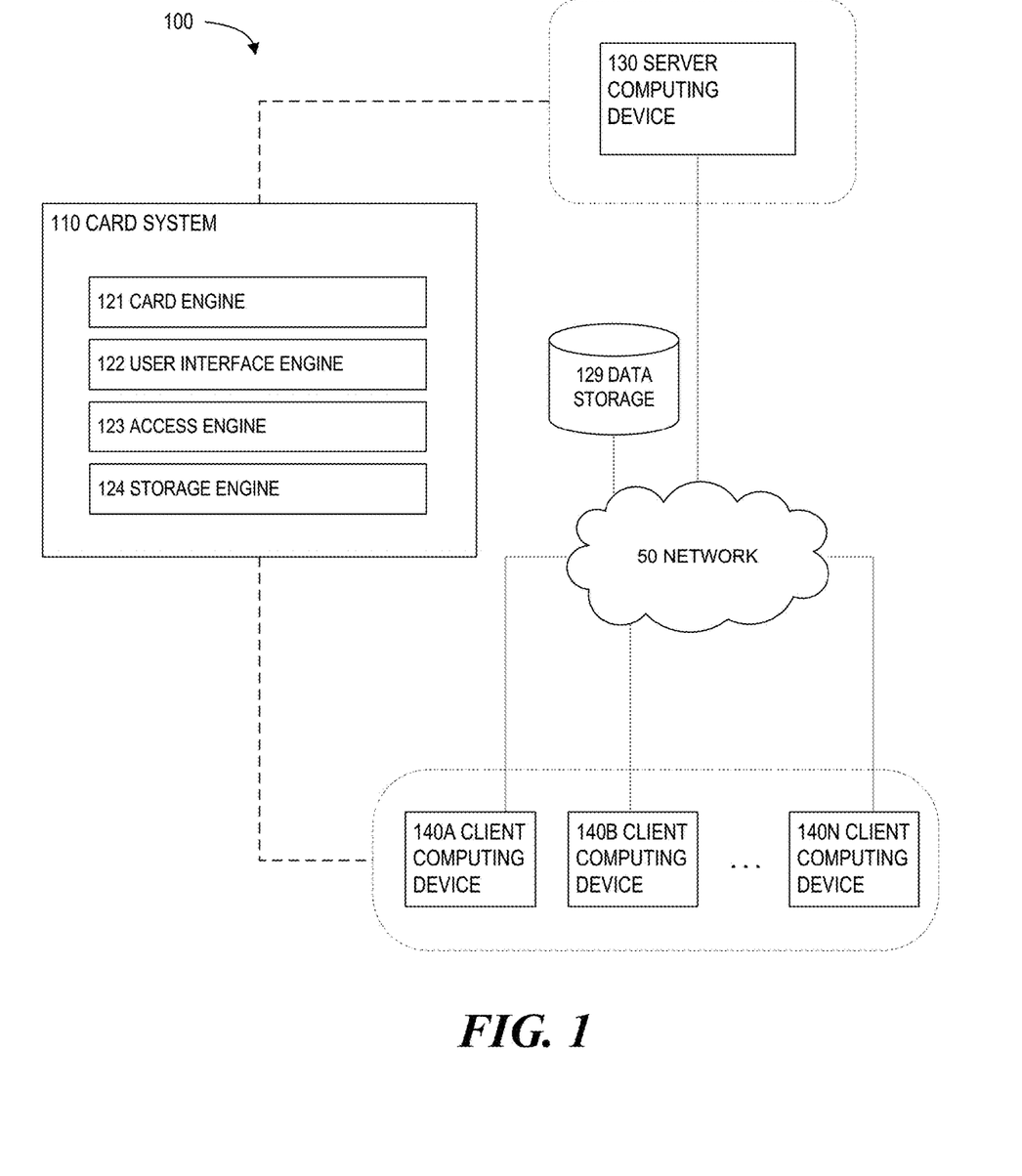
FIG. 1 is a block diagram depicting an example environment in which various examples may be implemented as a card system.

FIG. 1 is an example environment 100 in which various examples may be implemented as a card system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, card system 110 and the various components described herein may be implemented in hardware and/or a combination of hardware and programming that configures hardware. Furthermore, in FIG. 1 and other Figures described herein, different numbers of components or entities than depicted may be used.

Card system 110 may comprise a card engine 121, a user interface engine 122, an access engine 123, a storage engine 124, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Card engine 121 may generate a card and/or a content tile therein. A "card," as used herein, refers to a reusable component that behaves like a shell or template that can support any content in it, including any number of content tiles. Thus, a card may act as a shell that encapsulates any number of content tiles. A card may comprise a card header, a content tile, and/or other elements. A card header may comprise a title and/or sub-title(s) that briefly describe the card and/or the content tile thereof. In some implementations, the header may include other information such as a timeframe associated with the card (e.g., a timeframe associated with a particular security alert) and an identifier associated with the card (e.g., an alert identifier, a user identifier, etc.). The header may be composed of any textual (e.g., a string, a dropdown menu), visual (e.g., graphical icons), and/or audio data. A display section for the card header may appear visually different (e.g., different in color, shade, pattern, etc.) from the rest of the card to make the header relatively more noticeable. A "security alert," as used herein, refers to an alert notifying interested parties regarding a potential security threat or cyberattack.

A "content tile," as used herein, refers to a reusable component that delivers the main content of the card. Similar to the card header, a content tile may be composed of any textual (e.g., a string, a dropdown menu), visual (e.g., graphical icons, graphs, charts, tables), and/or audio (e.g., a voice record) data. The content tile may be reusable, meaning that a particular content tile can be reused as a standalone component without a card, or reused in a single card or multiple different cards. For example, a content tile in a first card may be decoupled from the first card such that the content tile can be used for a second card that is different from the first card, or the content tile may be used without being associated with any card (e.g., reused as a standalone component without a card).

Figure 7:
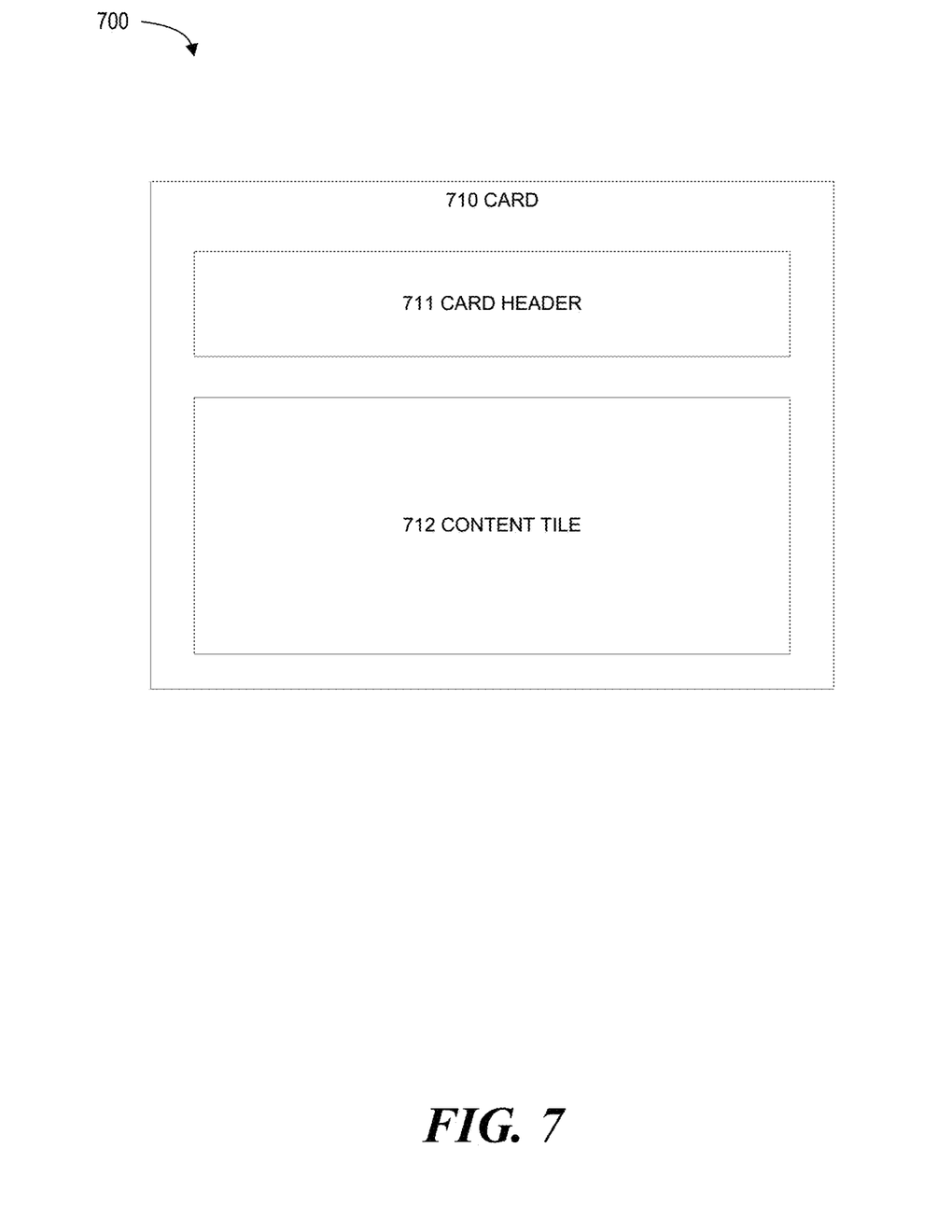
FIG. 7 is a diagram depicting an example user interface for presenting a card.
Figure 8:
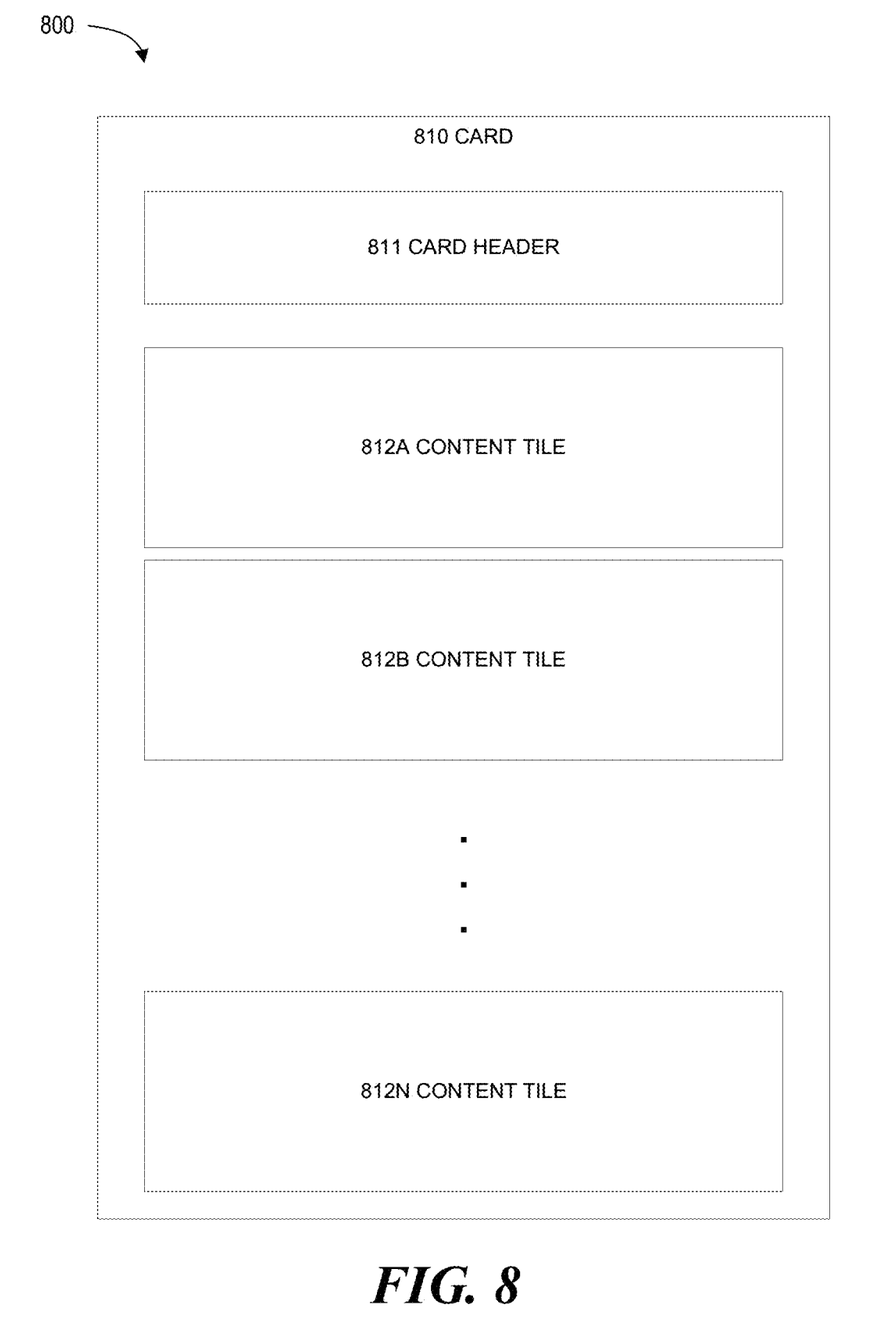
FIG. 8 is a diagram depicting an example user interface for presenting a card with a plurality of content tiles.

In the example illustrated in FIG. 7, a card 710 has a card header 711 and a content tile 712. Although two elements 711 and 712 are shown in the example, card 710 may include more than one card header, more than one content tile, and/or other elements other than the two elements. FIG. 8 provides an example of a card 810 that includes more than one content tile (e.g., content tile 812A, 812B, . . . , 812N).

A content tile (e.g., content tile 712 in FIG. 7) may describe a particular object that is associated with a plurality of content items. An "object," as used herein, refers to any object, including an alert, a user, a source host, an IP address, and/or other security or non-security related entity or object, that a card (and the content tile thereof) describes and provides content for by providing a plurality of content items within the content tile.

When a card is presented on a user interface, a user may request more details on a particular content item in the content tile. This user selection (e.g., clicking on a link for the particular content item, hovering the cursor over the particular content item, and/or other ways to indicate the user selection) would trigger another card to be displayed on the user interface where the new card has a content tile that includes the requested details for the particular content item. A "user," as used herein, refers to any user who may create, view, edit, make a duplicate of, or otherwise access various cards in the card system framework. In some instances, a "user," as used herein, refer to a user associated with a user identifier that appears in a card. For example, a user identifier of a potential attacker may be recorded along with its associated security alerts, IP addresses, ports being used, etc. When the user identifier is clicked from a first card, a second card may be presented having a content tile that describes this potential attacker being associated with this user identifier. The content tile may include the security alerts, IP addresses, ports being used, and/or other tracked information associated with the user identifier.

In the example illustrated in FIG. 9, a first card (e.g., a card 910) may be presented on a user interface (e.g., via user interface engine 122 as further discussed below). The first card comprises a first card header (e.g., a card header 911) and a first content tile (e.g., a content tile 912). The first content tile may describe a first object that is associated with a first plurality of content items. Once card engine 121 receives, via the user interface, an indication that a first content item (among the first plurality of content items) is requested about the first object, card engine 121 may generate a second card (e.g., a card 920) to be presented on the user interface. The indication that the first content item is requested about the first object may comprise a user selection of a graphical user interface (GUI) element associated with the first content item of the first card. For example, the first content item, a source host identifier, may be hyperlinked for a user to click on. The GUI element comprising the hyperlinked textual string for the source host identifier, once clicked, would cause the second card to appear on the user interface where the second card comprises a second content tile (e.g., a content tile 922) that describes the source host identifier (e.g., a second object). A second plurality of content items in the second content tile may include content about the particular source host, including, but not being limited to: a number of alerts associated with the source host identifier, a description of alerts associated with the source host identifier, a risk score associated with the source host identifier, and a predicted attack path based on a historical information associated with the source host identifier.

In some implementations, not all content items in the first plurality of content items are available for a user selection. This means that the GUI elements associated with some content items among the first plurality of content items may be unavailable for a user selection. For example, while the GUI element for the source host identifier is hyperlinked (therefore is clickable), the GUI element for the severity level (e.g., a second content item of the first card) is not hyperlinked (therefore is not clickable).

In some implementations, card engine 121 may receive, via the user interface, an indication that a third content item (among the first plurality of content items) is requested about the first object. In response to that indication, card engine 121 may generate a third card (e.g., a card 930 in FIG. 9) to be presented on the user interface. The third content item may be an IP address. The third card may comprise a third content tile (e.g., a content tile 932 in FIG. 9) that describes the particular IP address (e.g., a third object). A third plurality of content items in the third content tile may include content about the particular IP address, including, but not being limited to: a port associated with the IP address, an alert associated with the IP address, a risk score associated with the IP address, and a predicted attack path based on a historical information associated with the IP address. In other implementations, the third card (e.g., card 930 in FIG. 9) may be presented in response to an indication that a content item (among the second plurality of content items) is requested about the second object, instead of the first object. Based on a user selection of one of the content items in the second card, the third card about the selected content item may appear on the user interface as the next card. In these implementations, the selected content item may be a user identifier. The third card may then comprise a third content tile (e.g., content tile 932 in FIG. 9) that describes the particular user identifier (e.g., a third object). A third plurality of content items in the third content tile may include content about the particular user identifier, including, but not being limited to: an IP address associated with the user identifier, a port associated with the user identifier, an alert associated with the user identifier, a risk score associated with the user identifier, and a predicted attack path based on a historical information associated with the user identifier.

In response to an indication that a particular content item is requested about a particular object, card engine 121 may generate an object definition in the card system framework where the object definition comprises a target card property and/or a source card property. The target card property and/or source card property may comprise at least one parameter. The parameter(s) may be used to retrieve content items for the next card, or in other words, the target card. The parameter(s) may include, but not be limited to: (i) a timeframe within which timestamps of the content items to be retrieved for the target card should be, (ii) an object or user identifier, (iii) a status, and (iv) a category.

Returning to the above example, once card engine 121 receives, via the user interface, an indication that the first content item (among the first plurality of content items) is requested about the first object, card engine 121 may generate a second object definition. The second object definition may comprise a target card property that refers to the second card (e.g., card 920 in FIG. 9) to be presented on the user interface. The second object definition may comprise a source card property that refers to the first card (e.g., card 910 in FIG. 9). Card engine 121 may retrieve the second plurality of content items for the second card based on the target card property of the second object definition. Therefore, the resulting second card may comprise the second content tile (e.g., content tile 922 in FIG. 9) that includes the second plurality of content items. Similarly, if card engine 121 subsequently receives, via the user interface, an indication that the second content item (among the first plurality of content items) is requested about the first object, card engine 121 may generate a third object definition. The third object definition may comprise a target card property that refers to the third card (e.g., card 930 in FIG. 9) to be presented on the user interface. The third object definition may comprise a source card property that refers to the first card (e.g., card 910 in FIG. 9).

The parameter(s) of the second object definition may be originated from a first object definition for the first card. When a new (or second) object definition is generated for a next (or second) card, the new (or second) object definition may automatically inherit value(s) of the parameter(s) from the previous (or first) object definition for the previous (or first) card. In other words, the timeframe associated with the second plurality of content items in the second card (e.g., a timeframe within which timestamps of the second plurality of content items to be retrieved for the second card should be) would be the same timeframe associated with the first plurality of content items in the first card (e.g., a timeframe within which the timestamps of the first plurality of content items were). In some implementations, card engine 121 may modify a value of a parameter to be inherited by the second object definition. The timeframe that was inherited by the second object definition from the first object definition may be changed to a different timeframe, for example, based on user input.

In some implementations, card engine 121 may retrieve the second plurality of content items for the second card based on the second object definition (e.g., the parameter that is included in the target card property of the second object definition). Card engine 121 may transform the second plurality of content items into a card-ready format. The card-ready format may be a predefined template format for a specific type of card. Card engine 121 may generate an output object based on the transformed content items. For example, in response to an indication that a source host identifier is clicked by a user from the first card (e.g., card 910 in FIG. 9), card engine 121 may generate the second object definition for that source host identifier as the second object. Card engine 121 may retrieve the second plurality of content items for the second card (e.g., card 920 in FIG. 9) based on the second object definition. Once the second plurality of content items are transformed into a card-ready format that is predefined for the card type associated with the second card, card engine 121 may generate an output object (that is the second object) using the transformed content items. Therefore, the second card that is being presented on the user interface may comprise the second content tile (e.g., content tile 922 in FIG. 9) that describes the second object. This second content tile includes the second plurality of content items that have been retrieved and transformed into the appropriate card-ready format.

User interface engine 122 may present a card (e.g., generated by card engine 121 as discussed above) and/or cause the card to be displayed on a user interface.

As a user (including a single user, a group of users, users with a particular user role, or users while performing a particular task or action) continues to interact with various cards being presented on the user interface and request additional details about certain content items, more cards would appear on the user interface. This collection of cards may be arranged in the order of time (e.g., the newest card to the oldest card), priority, importance, and/or another particular order of arrangement. In one example, the cards may appear stacked on top of each other from the newest card (e.g., card 930 in FIG. 9) to the oldest card (e.g., card 910 in FIG. 9). In this way, this collection of cards would provide a well-documented history of the user's research or investigation. The user or any other user who is granted access to this collection of cards may scroll up and down to review the history of the research or investigation.

Figure 10:
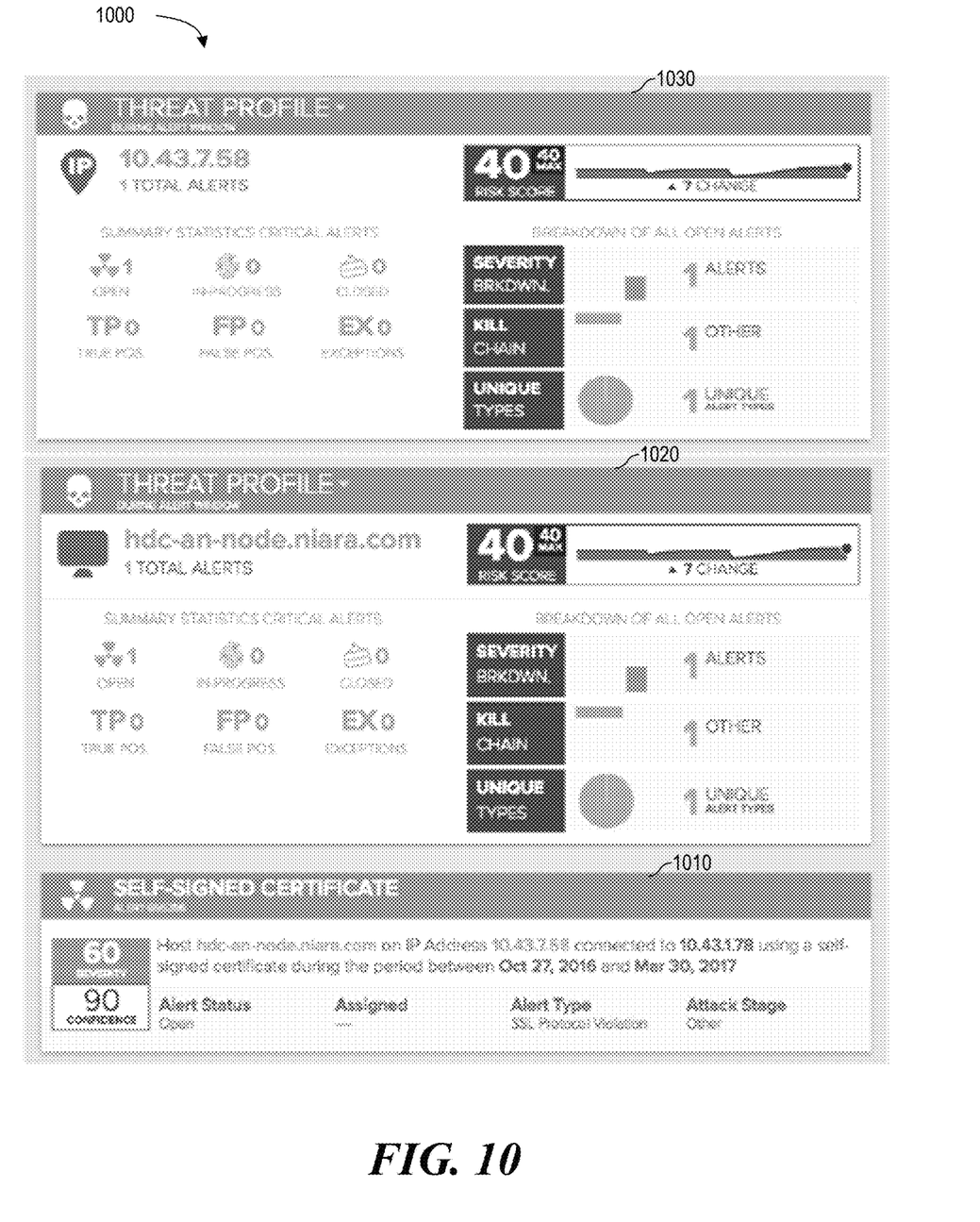
FIG. 10 is a diagram depicting an example user interface for presenting a plurality of cards that appear stacked on top of each other.

An example user interface for displaying a collection of cards is illustrated in FIG. 10. In the example illustrated in FIG. 10, a card 1010 for a particular security alert may have a card header such as "Self-Signed Certificate" with the corresponding alert identifier, and a content tile with information about a source host identifier associated with the alert, an Internet Protocol (IP) address associated with the alert, a severity level for the alert, a confidence level for the alert, an alert status, a user identifier (e.g., a user or security analyst assigned to an investigation task for the alert, a user that is associated with the IP address, and/or any user who might be related to the alert), an alert type, an attack stage, a port (e.g., an identification of the port via which the network connection was made, an indication that a port scan was made, and/or other information about a port or port usage), a protocol (e.g., volume of network traffic over the Transmission Control Protocol (TCP)), a geographical location (e.g., a user or entity's appearing in multiple locations in a short timeframe (land speed violation), a particular geographical location that has been flagged to be a problematic area, and/or other information about a geographical location), a timeframe associated with the alert, and/or other information.

When a user clicks on the hyperlinked GUI element for the source host identifier "hdc-an-node.niara.com" from card 1010, user interface engine 122 may present card 1020 (e.g., generated by card engine 121 as discussed above) and/or cause card 1020 to be displayed on the user interface. Card 1020 for the source host identifier "hdc-an-node.niara.com" has a content tile with the information about the source host identifier, including the number of alerts associated with the source host identifier, summary statistics for critical alerts associated with the source host identifier, a risk score associated with the source host identifier, and a breakdown of all open alerts associated with the source host identifier.

When the user subsequently clicks on another hyperlinked GUI element for the IP address "10.43.7.58" from card 1010, user interface engine 122 may present card 1030 (e.g., generated by card engine 121 as discussed above) and/or cause card 1030 to be displayed on the user interface. Card 1030 for the IP address "10.43.7.58" has a content tile with the information about the IP address, including the number of alerts associated with the IP address, summary statistics for critical alerts associated with the IP address, a risk score associated with the IP address, and a breakdown of all open alerts associated with the IP address.

Access engine 123 may determine an appropriate access level for various cards in card system 110. Returning to the above example as discussed with respect to card engine 121, the first, second, and third cards (e.g., cards 910, 920, and 930 in FIG. 9) may be associated with a particular user account, a particular user role, or a particular task.

Continuing with the example, the selections of the first and second content items may be performed by a same user. In this case, the first card and the second and third cards that appeared in response to these user selections may be associated with the particular user account of this user. This may mean that when the user logs into his or her user account, the user may access all three cards by viewing the three cards stacked on top of each other so that the user can review the history of his research or investigation, editing any one of the cards, making a duplicate card or a duplicate collection of cards for further research or investigation, and/or sharing any of the cards with another user. In some instances, the user account may be associated with a plurality of users. Consider this scenario: there is a team of people conducting an investigation on a particular security alert. A first user of this team made a user selection of the first content item, which caused the second card to appear on the user interface. Subsequently, a second user of this team made a user selection of the second content item, which caused the third card to appear on the user interface. Although different users interacted with the cards, each user of this team may access all three cards by viewing the three cards stacked on top of each other so that each user of the team can review the history of the team's collective research or investigation, editing any one of the cards, making a duplicate card or a duplicate collection of cards for further research or investigation, and/or sharing any of the cards with another user. "Sharing," as used herein, refers to granting access to a designated user or user(s). How much access should be granted may be automatically determined by system 110 or manually determined based on user input. For example, a card may be shared with a particular user such that the particular user has an ability to view the card without an ability to edit the card. In another example, a card may be shared with a particular user such that the user has an ability to view and make a duplicate of the card without an ability to edit the card.

In some implementations, the selections of the first and second content items may be performed by users having a same user role. In this case, the first card and the second and third cards that appeared in response to these user selections may be associated with the particular user role. Consider this scenario: there is a group of users with a first user role (e.g., an investigation manager role), and another group of users with a second user role (e.g., an analyst role). A first user with the first user role made a user selection of the first content item, which caused the second card to appear on the user interface. Subsequently, a second user with the first user role made a user selection of the second content item, which caused the third card to appear on the user interface. Although different users interacted with the cards, each user with this first role may access all three cards by viewing the three cards stacked on top of each other so that each user in the first role can review the history of the research or investigation, editing any one of the cards, making a duplicate card or a duplicate collection of cards for further research or investigation, and/or sharing any of the cards with another user. On the other hand, users with the second user role would not be able to access the three cards.

In some implementations, the selections of the first and second content items may be performed as part of a same task. In this example, a plurality of users may be performing a same research or investigation task. Similar to the above examples, although different users interacted with the cards while performing this same task, each user assigned to this task may access all three cards by viewing the three cards stacked on top of each other so that each user can review the history of the research or investigation, editing any one of the cards, making a duplicate card or a duplicate collection of cards for further research or investigation, and/or sharing any of the cards with another user.

Storage engine 124 may store content items, object definitions, objects, content tiles, card headers, cards, and/or other information related to card system 110 in a data storage (e.g., data storage 129 in FIG. 1).

In some implementations, storage engine 124 may store a collection of cards (e.g., a history of an investigation or research task, generated by card engine 122 as discussed above) in a particular order or sequence of those cards at the time of storing or saving (e.g., how those cards are currently arranged at the time of storing or saving). In other words, storage engine 124 may store the current state of investigation or research progress at the time of storing or saving. In this way, a user who has access to this collection of cards (e.g., a user originally assigned to the investigation or research task, a user who was given access through "sharing" as defined above) may save the progress, re-initiate the investigation or research by picking up from where he or she was left off, and/or share the saved version of the cards with another user to review and/or continue the investigation.

In some implementations, a card and/or a collection of cards (e.g., generated by card engine 121 as discussed above) may be stored as a static image file (e.g., jpeg, png, etc.). Although the card in this static image file format would not be interactive (e.g., a user is not able to click on any of the content items in the card), the small file size of this static image file allows card system 110 to retain the card for a longer period of time. On the other hand, the raw data for the card, which makes the card interactive, due to its large file size, may need to be deleted from the data storage after a certain predefined time period (e.g., after 90 days).

In performing their respective functions, engines 121-124 may access data storage 129 and/or other suitable database (s). Data storage 129 may represent any memory accessible to card system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Card system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
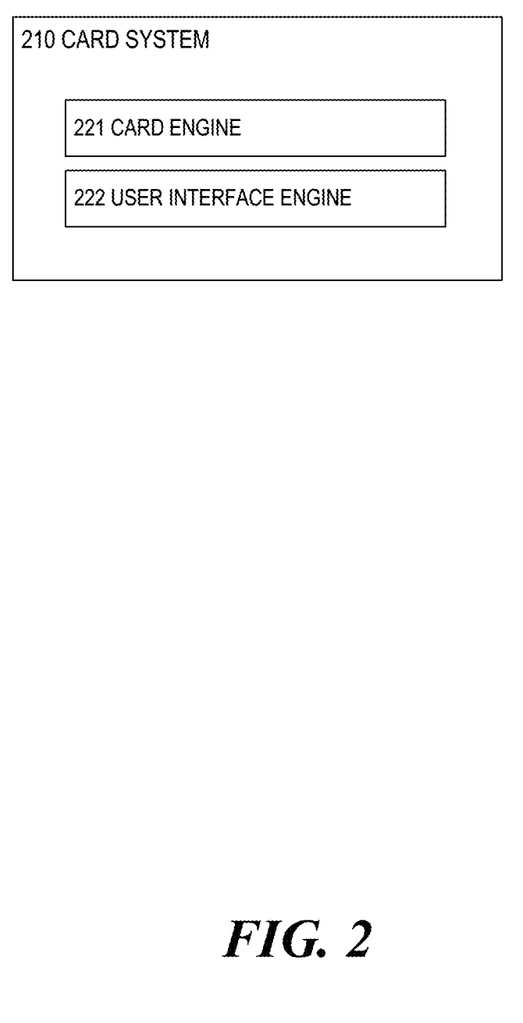
FIG. 2 is a block diagram depicting an example card system.

FIG. 2 is a block diagram depicting an example card system 210. Card system 210 may comprise a card engine 221, a user interface engine 222, and/or other engines. Engines 221-222 represent engines 121-122, respectively.

Figure 3:
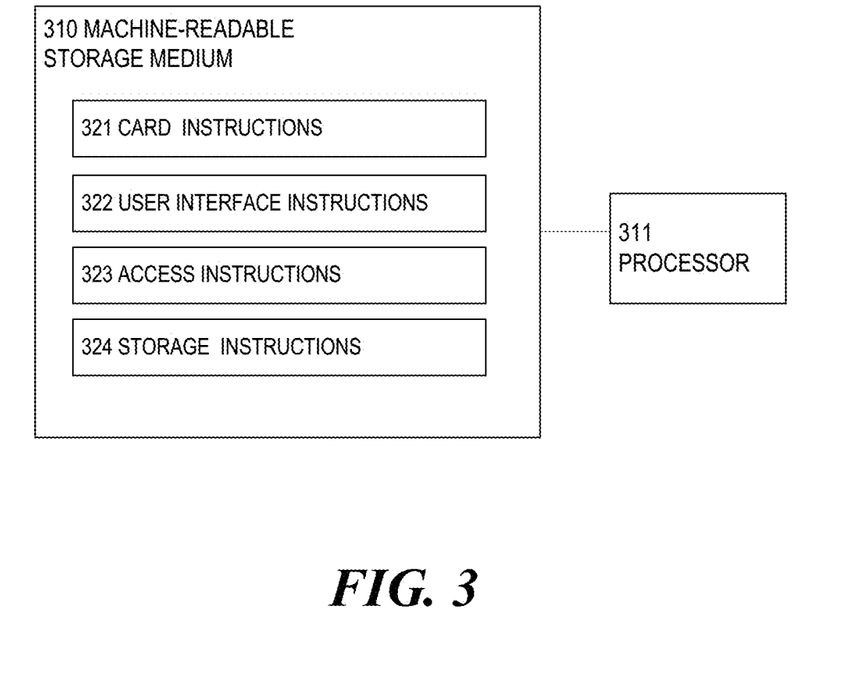
FIG. 3 is a block diagram depicting an example machine-readable storage medium comprising instructions executable by a processor for enabling security investigations using a card system framework.

FIG. 3 is a block diagram depicting an example machine-readable storage medium 310 comprising instructions executable by a processor for enabling security investigations using a card system framework.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements card system 110 of FIG. 1.

In FIG. 3, the executable program instructions in machine-readable storage medium 310 are depicted as card instructions 321, user interface instructions 322, access instructions 323, and storage instructions 324. Instructions 321-324 represent program instructions that, when executed, cause processor 311 to implement engines 121-124, respectively.

Figure 4:
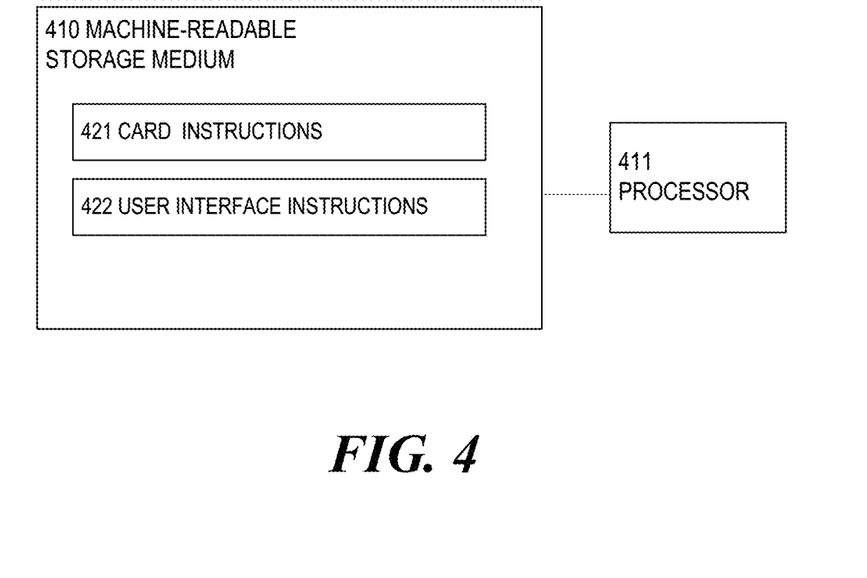
FIG. 4 is a block diagram depicting an example machine-readable storage medium comprising instructions executable by a processor for enabling security investigations using a card system framework.

FIG. 4 is a block diagram depicting an example machine-readable storage medium 410 comprising instructions executable by a processor for enabling security investigations using a card system framework.

Referring to FIG. 4, the programming may be processor executable instructions 421-422 stored on a machine-readable storage medium 410 and the hardware may include a processor 411 for executing those instructions. Thus, machine-readable storage medium 410 can be said to store program instructions or code that when executed by processor 411 implements card system 110 of FIG. 1.

In FIG. 4, the executable program instructions in machine-readable storage medium 410 are depicted as card instructions 421 and user interface instructions 422. Instructions 421-422 represent program instructions that, when executed, cause processor 411 to implement engines 121-122, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement card system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-422, and/or other instructions. As an alternative or in addition to retrieving and executing instructions, processor 411 may include at least one electronic circuit comprising a number of electronic components for performing the functionality of at least one of instructions 421-422, and/or other instructions.

Figure 5:
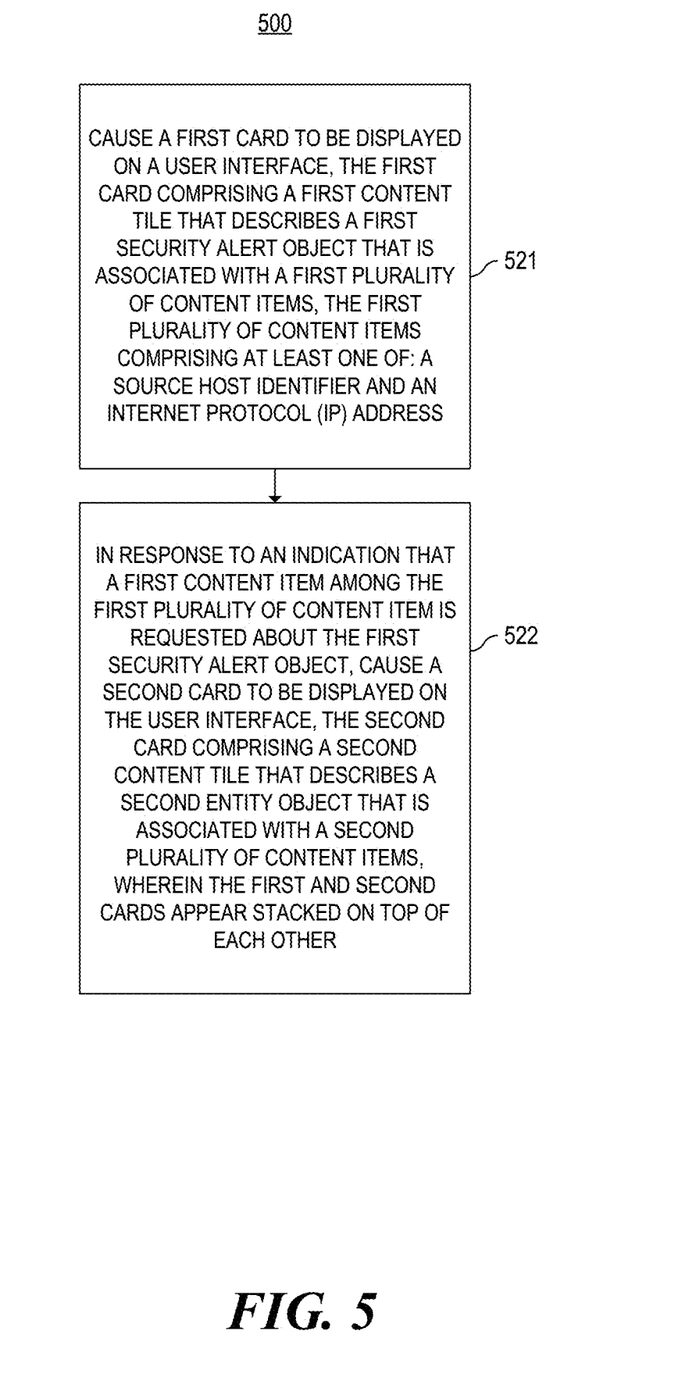
FIG. 5 is a flow diagram depicting an example method for enabling security investigations using a card system framework.

FIG. 5 is a flow diagram depicting an example method 500 for enabling security investigations using a card system framework. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

Referring back to FIG. 1, user interface engine 122 may be responsible for implementing blocks 521 and 522.

Figure 6:
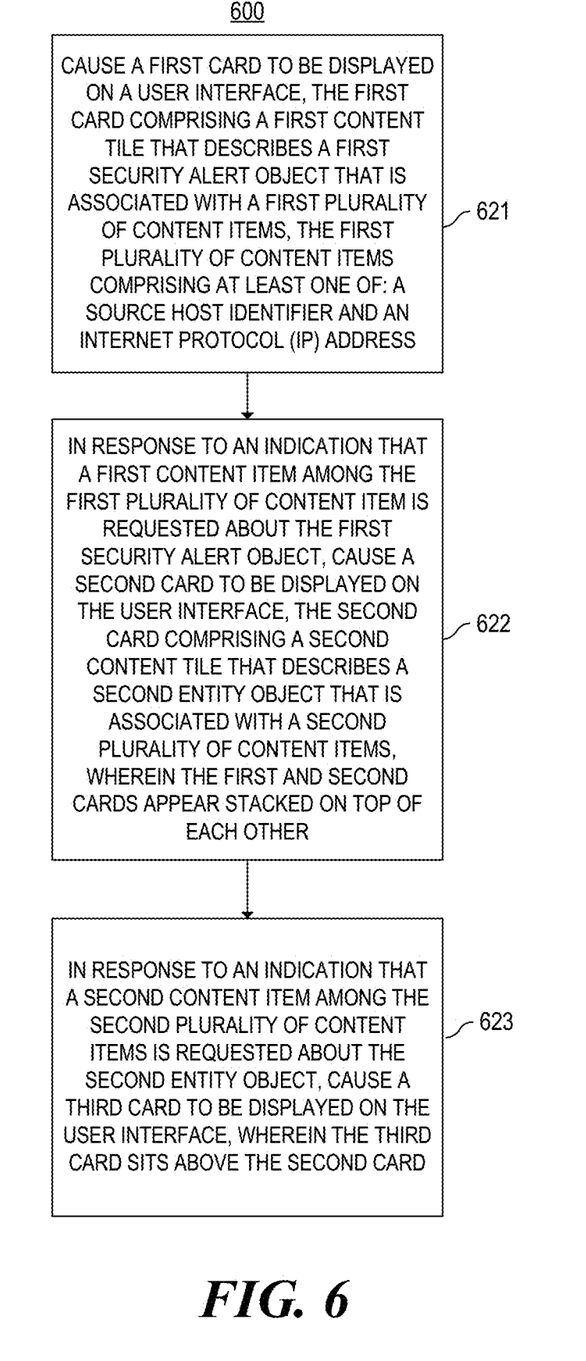
FIG. 6 is a flow diagram depicting an example method for enabling security investigations using a card system framework.

FIG. 6 is a flow diagram depicting an example method 600 for enabling security investigations using a card system framework. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

Referring back to FIG. 1, user interface engine 122 may be responsible for implementing blocks 621-623.

FIG. 7 is a diagram depicting an example user interface 700 for presenting a card. User interface 700 (and other user interfaces described herein) may be used to cause various actions to be performed by card system 110.

FIG. 8 is a diagram depicting an example user interface 800 for presenting a card with a plurality of content tiles.

Figure 9:
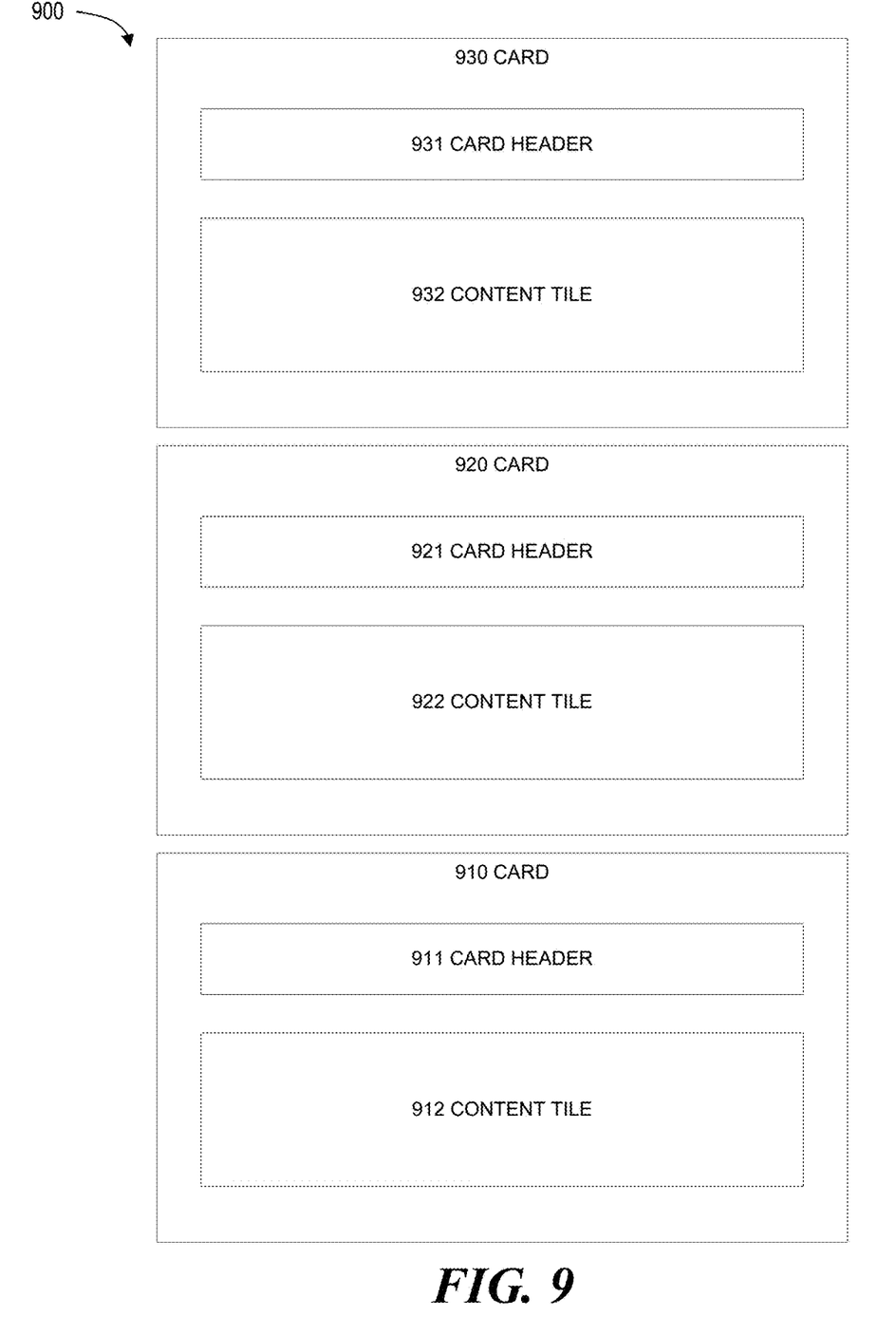
FIG. 9 is a diagram depicting an example user interface for presenting a plurality of cards that appear stacked on top of each other.

FIG. 9 is a diagram depicting an example user interface 900 for presenting a plurality of cards that appear stacked on top of each other.

FIG. 10 is a diagram depicting an example user interface 1000 for presenting a plurality of cards that appear stacked on top of each other.

FIGS. 7-10 are discussed herein with respect to FIG. 1.

The foregoing disclosure describes a number of example implementations for enabling security investigations. The disclosed examples may include systems, devices, computer-readable storage media, and methods for enabling security investigations. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A non-transitory machine-readable storage medium comprising instructions executable by a hardware processor for enabling security investigations using a card system framework, the machine-readable storage medium comprising:

instructions to present a first card on a user interface, the first card comprising a first content tile that describes a first security alert object that is associated with a first plurality of content items, the first plurality of content items comprising at least one of: a source host identifier, an Internet Protocol (IP) address, a severity level, a confidence level, an alert status, a user identifier, an alert type, an attack stage, a port, a protocol, and a geographical location; and in response to an indication that a first content item among the first plurality of content item is requested about the first security alert object, instructions to present a second card on the user interface, the second card comprising a second content tile that describes a second entity object that is associated with a second plurality of content items, wherein a first object definition for the first card comprises a parameter, and wherein the second object definition inherits a value of the parameter from the first object definition.

2. The non-transitory machine-readable storage medium of claim 1, comprising:

instructions to present the first and second cards on the user interface such that the first and second cards appear stacked on top of each other.

3. The non-transitory machine-readable storage medium of claim 1, wherein the indication that the first content item is requested about the first security alert object comprises a user selection of a graphical user interface (GUI) element associated the first content item of the first card that is being presented on the user interface.

4. The non-transitory machine-readable storage medium of claim 1, wherein a GUI element associated of a second content item of the first card is unavailable for a user selection.

5. The non-transitory machine-readable storage medium of claim 1, wherein the first content item is the source host identifier, the second entity object is a source host object, and the second plurality of content items comprises a threat profile of the source host identifier.

6. The non-transitory machine-readable storage medium of claim 5, wherein the threat profile comprises at least one of: a number of alerts associated with the source host identifier, a description of alerts associated with the source host identifier, a risk score associated with the source host identifier, and a predicted attack path based on a historical information associated with the source host identifier.

7. The non-transitory machine-readable storage medium of claim 1, wherein the first content item is the user identifier, the second entity object is a user object, and the second plurality of content items comprises a user profile of the user identifier.

8. The non-transitory machine-readable storage medium of claim 7, wherein the user profile comprises at least one of: an IP address associated with the user identifier, a port associated with the user identifier, an alert associated with the user identifier, a risk score associated with the user identifier, and a predicted attack path based on a historical information associated with the user identifier.

9. The non-transitory machine-readable storage medium of claim 1, wherein the first content item is the IP address, the second entity object is an IP address object, and the second plurality of content items comprises a threat profile of the IP address.

10. The non-transitory machine-readable storage medium of claim 9, wherein the threat profile comprises at least one of: a port associated with the IP address, an alert associated with the IP address, a risk score associated with the IP address, and a predicted attack path based on a historical information associated with the IP address.

11. The method for enabling security investigations using a card system framework, the method comprising:

causing, by a hardware processor of the card system framework, a first card to be displayed on a user interface, the first card comprising a first content tile that describes a first security alert object that is associated with a first plurality of content items, the first plurality of content items comprising at least one of: a source host identifier and an Internet Protocol (IP) address; and in response to an indication that a first content item among the first plurality of content item is requested about the first security alert object, causing, by the hardware processor of the card system framework, a second card to be displayed on the user interface, the second card comprising a second content tile that describes a second entity object that is associated with a second plurality of content items, wherein the first and second cards appear stacked on top of each other, wherein a first object definition for the first card comprises a parameter, and wherein the second object definition inherits a value of the parameter from the first object definition.

12. The method of claim 11, comprising:

in response to an indication that a second content item among the second plurality of content items is requested about the second entity object, causing a third card to be displayed on the user interface, wherein the third card sits above the second card.

13. The method of claim 11, comprising:

in response to an indication that a second content item among the first plurality of content items is requested about the first security alert object, causing a third card to be displayed on the user interface, wherein the third card sits above the second card.

14. The method of claim 11, wherein the first and second cards are associated with a particular user account, a particular user role, or a particular task.

15. The method of claim 14, wherein the first and second cards are associated with a first user account, comprising:

allowing a second user account, that is different from the first user account, to access the first and second cards, wherein the access comprises at least one of: an access to edit, an access to view, and an access to create a duplicate card.

16. The method of claim 11, wherein the second plurality of content items are associated with timestamps that are within a timeframe associated with the first card.

17. A system for enabling security investigations using a card system framework, the system comprising a hardware processor that executes machine-readable instructions that cause the system to:

cause a first card to be displayed on a user interface, the first card comprising a first content tile that describes a first security alert object that is associated with a first plurality of content items, the first plurality of content items comprising at least one of: a source host identifier and an Internet Protocol (IP) address; and in response to an indication that a first content item among the first plurality of content item is requested about the first security alert object, generate a second object definition in the card system framework, the second object definition comprising a target card property that refers to a second card, and a source card property that refers to the first card, wherein a first object definition for the first card comprises a parameter, and wherein the second object definition inherits a value of the parameter from the first object definition;

retrieve a second plurality of content items for the second card based on the target card property; and cause the second card to be displayed on the user interface, wherein the second card comprising a second content tile that comprises the second plurality of content items.

18. The system of claim 17, wherein the first content item is the user identifier, and the parameter includes the user identifier.

19. The system of claim 17, wherein the first content item is the IP address, and the parameter includes the IP address.

20. The system of claim 17, wherein the parameter comprises one or more of: a timeframe within which a timestamp of a content item to be retrieved for the target card should occur, an object or a user identifier, a status, or a category.

* * * * *